(No Model.) 2 Sheets—Sheet 1.
C. A. HAGUE.
SULKY PLOW.
No. 283,102. Patented Aug. 14, 1883.
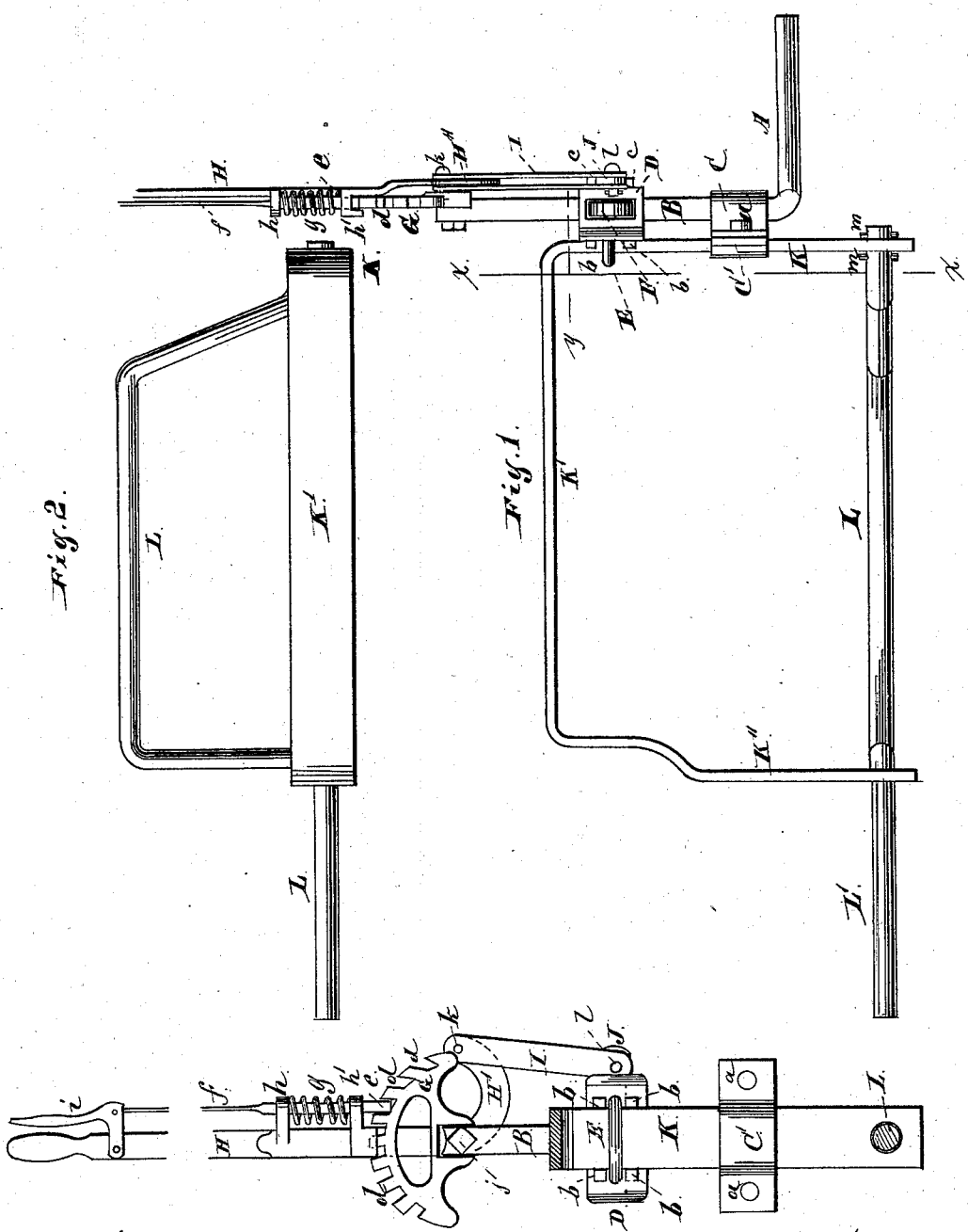
Witnesses:
Albert H. Adams,
B. A. Price.
Inventor:
Charles A. Hague
By West & Bond.
His Attys.

(No Model.)  2 Sheets—Sheet 2.
C. A. HAGUE.
SULKY PLOW.
No. 283,102.  Patented Aug. 14, 1883.
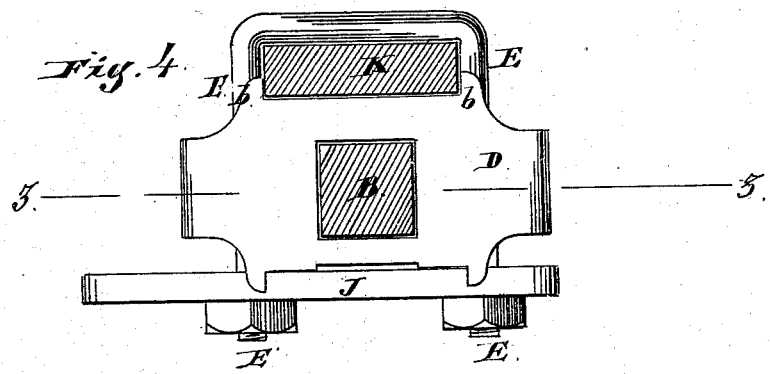
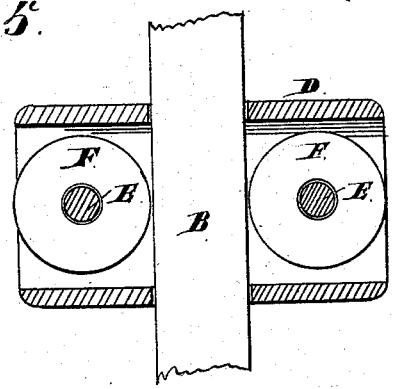
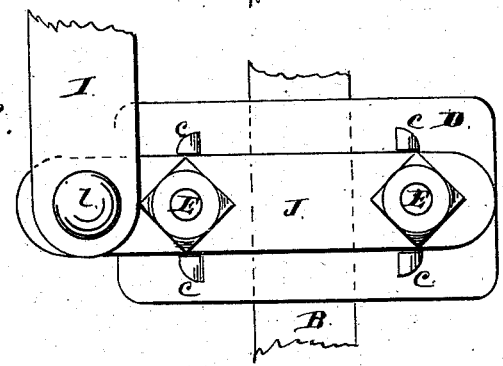
Witnesses:
Albert H. Adams
B. A. Price
Inventor:
Charles A. Hague.
By West & Bond
His Attys.

UNITED STATES PATENT OFFICE.

CHARLES A. HAGUE, OF CHICAGO, ILLINOIS, ASSIGNOR TO FURST & BRADLEY MANUFACTURING COMPANY, OF SAME PLACE.

SULKY-PLOW.

SPECIFICATION forming part of Letters Patent No. 283,102, dated August 14, 1883.

Application filed October 10, 1882. (No model.)

*To all whom it may concern:*

Be it known that I, CHARLES A. HAGUE, residing at Chicago, in the county of Cook and State of Illinois, and a citizen of the United States, have invented new and useful Improvements in Sulky-Plows, of which the following is a full description, reference being had to the accompanying drawings, in which—

Figure 1 is a front elevation of the cranked axle, frame, and leveling devices; Fig. 2, a top or plan view of the crank-axle and frame; Fig. 3, a section on line $x\ x$ of Fig. 1, looking toward the leveling devices; Fig. 4, an enlarged detail, being a section on line $y$ of Fig. 1; Fig. 5, a section on line $z\ z$ of Fig. 4; Fig. 6, an enlarged detail, showing the upper socket for the spindle-bar and portion of the lifting-link and of the spindle-bar.

This invention relates to leveling devices applied to a sulky-plow on the furrow side, for the purpose of raising and lowering the frame to have the plow run even and level, and has for its object to enable such raising and lowering of the frame to be attained in a simple and easy manner and in a direct line without any great inconvenience or trouble to the operator, and doing away with a large proportion of the friction attending the movement of the frame in raising and lowering; and its nature consists in providing a spindle-bar carrying the spindle for the land-wheel, located in brackets or sockets, one of which is secured to the spindle-bar and slides on the vertical bar of the frame, and the other is attached to the vertical bar of the frame, and the spindle-bar slides therein, and having attached to its upper end a segmental rack, and combining therewith a lifting-lever, connecting-link, attaching-strap, and locking-pawl, and anti-friction rollers moving on the spindle-bar, as hereinafter more specifically pointed out and claimed as new.

In the drawings only so much of a complete sulky-plow is shown as is deemed necessary to illustrate the invention.

A represents the spindle for the land-wheel, the wheel not being shown, but being located on the spindle, as usual; B, the bar carrying the spindle A, and forming the guide for the frame in raising and lowering. As shown, the spindle and bar are formed from the same piece; but they could be made of independent pieces suitable joined or connected together.

C C' is a bracket or socket, formed of metal plates, one of which, C, has a recess or opening formed therein corresponding in size to the spindle-bar, and receiving such bar and being secured thereto by means of a rivet or otherwise. The other section or plate, C', is provided with a depression or recess to receive the vertical piece or side of the frame, and the two pieces are secured together around the spindle-bar and the vertical portion of the frame by bolts $a$, passing through the projecting ends on each side, as shown in Figs. 1 and 3, so as to allow the frame to slide freely up and down in the portion C'.

D is a bracket or socket, of cast-iron or other suitable material, having a longitudinal opening and a vertical opening formed therein, the vertical opening fitting the spindle-bar B, so as to allow the bracket or socket to slide on such bar.

E is a staple-shaped fastening, made of wrought-iron or other suitable material, and having screw-threaded ends. This staple corresponds in width to the width of the side of the frame, and its sides are passed through suitable openings in the bracket or socket. The face of the bracket or head adjacent to the frame is provided with lugs $b$, located on each side near the top and bottom, between which the side piece of the frame fits, and by means of which and the fastening E the bracket or head D is securely clamped and fastened to the side piece of the frame, suitable nuts being provided on the ends of the strap or staple E, for drawing the parts together, as shown in Fig. 4.

F are anti-friction-rollers located in the longitudinal opening or recess in the head D, and mounted on the side of the strap or staple E, so that this strap or staple not only furnishes a fastening for attaching the head or bracket to the frame, but also the journals or bearings on which the anti-friction rollers F revolve. These rollers are of such diameter as to leave a space between them when mounted to receive the bar B, and bear against or come in contact therewith, and reduce the friction in moving the frame for leveling the plow.

G is a segmental rack, located on the upper end of the bar B, and secured thereto by means of a bolt, $j$, the rack having a socket or recess in which the end of the bar fits, making the union stronger and firmer, the bolt $j$ passing through the rack base and the end of the bar.

H H' is an L-lever the main portion H of which extends up so as to be within reach of the driver. This lever is pivoted by the same bolt which secures the rack to the bar B. The main portion of the lever, near its lower end, is provided with lugs or ears $h\,h'$, for the reception of a pawl or dog, $e$, which engages the notches $d$ of the segmental rack, the lug or ear $h'$ having a side lip or projection to form a recess to receive the edge of the rack and maintain the lever and rack in proper relation. The dog or pawl $e$ is attached to or formed with a rod, $f$, the upper end of which is attached to a bell-lever, $i$, pivoted to the lever H near its upper end, and a spring, $g$, is provided, located around the dog or pawl $e$, between the ears $h\,h'$, for forcing the dog or pawl into engagement with the notches $d$.

I are metal straps, the upper ends of which are pivoted by a suitable pin or pivot, $k$, to the outer end of the portion H' of the lever, and the lower ends are pivoted to a strap on the head D by a suitable pin or pivot, $l$. These straps I form a link connecting the end of the L-lever with the head D.

J is a metal strap or bar, attached to the outer face of the head D and held firmly in place by lugs $c$, formed on the head, between which the strap fits, the fastening being completed by the nuts on the end of the strap or staple E, which ends pass through suitable openings in the bar J. One end of this bar projects beyond the end of the head, and to it is attached the lower end of the link or straps I by the pin or pivot $l$.

K K' K'' is the arch or frame, K being the furrow side, K' the top or horizontal side, and K'' the land side.

L is the crank or bail carrying the plow, one end of which is journaled in the lower end of K, and is held in position by pins $m$ or otherwise, and the other end of which passes through the side K'', and is extended out and forms the spindle L' for the land-wheel.

By securing the bracket or box C firmly to the spindle-bar B and attaching the section C' thereto by means of bolts $a$ it will be seen that a stationary guide is formed for the vertical portion K of the arch or frame in which such portion is free to slide, and by attaching the bracket or box D firmly to the vertical piece K and allowing such bracket to slide on the bar B it will be seen that the bar and the frame are maintained in the same relative position, and at the same time the frame is free to be raised or lowered for adjusting purposes, the head or bracket D sliding on the bar B, and the side K of the frame sliding in the head or bracket C C'.

By locating the anti-friction rollers $f$ in the head D, one on each side of the bar B and bearing against such bar, it will be seen that a moving surface is provided for the head D to travel on the bar, producing less friction than if the head came in contact with the bar, and to that extent producing an easier and freer movement and obviating to a large extent the tendency of the parts to bind as the adjustments are made.

By locating the segmental rack on the upper end of the spindle-bar and pivoting the lever to the rack and bar by the same bolt, attaching the rack and connecting the lever with the head by the straps or plates I J, it will be seen that the actuating devices are brought into close relation with each other and occupy a very small and compact space, and at the same time the arrangement is one that permits of the easy operation of the parts in raising and lowering.

The anti-friction rollers can be applied to other forms of frames and spindle-bars than that shown for the purpose of removing the friction and preventing binding between the parts in use.

What I claim as new, and desire to secure by Letters Patent, is—

1. The spindle A and spindle-bar B, bracket or head C C', attached to the spindle-bar, bracket or head D, attached to the frame, and the side or vertical piece, K, of the frame, in combination with the rack G, lever H H', bolt $j$, link I, and bar J, substantially as and for the purposes specified.

2. The spindle-bar B and bracket or head C C', in combination with the bracket or head D, strap or staple E, anti-friction rollers F, and side or vertical piece, K, of the frame, substantially as and for the purposes specified.

3. The anti-friction rollers F, in combination with a spindle-bar and a support for the rollers, for removing friction and preventing binding between the parts, substantially as and for the purposes specified.

CHAS. A. HAGUE.

Witnesses:
HENRY L. BURNELL,
J. H. BRADLY.